United States Patent [19]
Short

[11] 3,930,078
[45] Dec. 30, 1975

[54] COATING WITH ARYLENE SULFIDE POLYMER CONTAINING COMPOUNDS TO ENHANCE CURE

[75] Inventor: James N. Short, Bartlesville, Okla.

[73] Assignee: Phillips Petroleum Company, Bartlesville, Okla.

[22] Filed: Dec. 4, 1974

[21] Appl. No.: 529,533

Related U.S. Application Data

[62] Division of Ser. No. 420,254, Nov. 29, 1973, Pat. No. 3,884,873.

[52] U.S. Cl. ............... 427/388; 427/385; 428/411; 428/426; 428/457; 428/538
[51] Int. Cl.² ..................... B05D 3/02; B32B 15/08
[58] Field of Search ............ 427/388, 385; 428/411, 428/426, 457, 538; 260/37 R, 45.7 PH, 45.95 R, 79, 79.1, 900

[56] References Cited
UNITED STATES PATENTS

| | | |
|---|---|---|
| 3,026,264 | 3/1962 | Rocklin et al. ....................... 252/52 |
| 3,285,855 | 11/1966 | Dexter et al. .......................... 252/57 |
| 3,354,129 | 11/1967 | Edmonds et al. ....................... 260/79 |
| 3,492,125 | 1/1970 | Ray ..................................... 427/388 |
| 3,622,376 | 11/1971 | Tieszen et al. ....................... 427/388 |
| 3,634,125 | 1/1972 | Tieszen ............................... 427/388 |
| 3,658,753 | 4/1972 | Reed et al. ....................... 260/45.7 P |

Primary Examiner—Harry J. Gwinnell

[57] ABSTRACT

Certain compounds are incorporated into arylene sulfide polymers. The resulting composition is precured to give a polymer of improved processability and/or applied to a substrate and cured to give a coating having improved characteristics. Said compounds are at least one of tetrakis[3-(3,5-di-tert-butyl-4-hydroxyphenyl) propionyloxymethyl] methane, or 1,3,5-trimethyl tris[3,5-di-tert-butyl-4-hydroxybenzyl] benzene, or octadecyl-3-(3',5'-di-tert-butyl-4'-hydroxyphenyl) propionate, or a polymeric phosphite.

9 Claims, No Drawings

COATING WITH ARYLENE SULFIDE POLYMER CONTAINING COMPOUNDS TO ENHANCE CURE

CROSS-REFERENCES TO RELATED APPLICATIONS

This application is a divisional of copending Ser. No. 420,254 filed Nov. 29, 1973, now U.S. Pat. No. 3,884,873.

BACKGROUND OF THE INVENTION

This invention relates to improving the characteristics of arylene sulfide polymer compositions.

It is known that arylene sulfide polymers are useful in coating applications. Coatings formed thereof are strong, heat stable and resistant to most industrial chemicals and fumes. Thus, for example, arylene sulfide polymers can be advantageously employed as coatings for metals such as steel, aluminum, nickel, brass, copper, as well as ceramics, glass and other substrates stable at the curing temperature required for the coating which can run as high as 800°F.

Arylene sulfide polymers are also ideally suited for molding techniques such as extrusion and injection molding. However, in many instances the polymer as produced, while having a very high melting point, nonetheless has an extremely low melt viscosity with the melt flow number (MFN) as measured by ASTM D 1238-65T (modified to use a 5 kilogram weight and a temperature of 343°C.) being greater than 2500 g in 10 minutes. To be usable in such applications, a melt flow in the range of only 1–200 is generally required.

BRIEF SUMMARY OF THE INVENTION

It is an object of this invention to provide an improved arylene sulfide polymer coated substrate; it is yet a further object of this invention to provide coating compositions comprising arylene sulfide polymers having enhanced processability, coating flexibility, and coating adherence; it is yet a further object of this invention to provide arylene sulfide coating compositions which can be cured at a relatively fast rate to form good, adherent, flexible coatings for metal and other materials without subjecting same to undesirably high temperatures; and it is still yet a further object of this invention to provide an arylene sulfide polymer composition having improved processability.

In accordance with this invention arylene sulfide polymer is compounded with at least one of tetrakis[3-(3,5-di-tert-butyl-4-hydroxyphenyl) propionyloxymethyl]methane, or 1,3,5-trimethyl tris[3,5-di-tert-butyl-4-hydroxybenzyl]benzene, or octadecyl-3-(3',5'-di-tert-butyl-4'-hydroxyphenyl)propionate, or a polymeric phosphite, and thereafter subjected to heat to at least partially cure the polymer.

DESCRIPTION OF THE PREFERRED EMBODIMENTS

The invention is applicable for use with any normally solid, heat curable, high molecular weight arylene sulfide polymer. The preferred arylene sulfide polymer is poly(phenylene sulfide) (PPS) having a melting or softening point of at least 300°F, preferably 400° to 850°F. Such polymer can be made in accordance with Edmonds et al., U.S. Pat. No. 3,354,129, Example I for instance. The disclosure U.S. Pat. No. 3,354,129 is hereby incorporated by reference. The preferred polymers have an inherent viscosity in chloronaphthalene at 206°C of at least 0.1, preferably between 0.1 and 0.3, more preferably between 0.13 and 0.23. A particularly preferred polymer is poly(phenylene sulfide) having a melt flow number of from 50 to about 2500 grams per 10 minutes (limit of the instrument measurement by ASTM D 1238-65T, modified to use 5 kilogram weight and a temperature of 343°C). The virgin PPS which normally may have a melt flow number of above 2500 can be precured by heating in air at 500° to 520°F for 1–6 hours to lower the initial melt flow for instance to the above 50 to 2500 range; or if it is desired to produce a molding grade resin the virgin PPS can be cured to a melt flow number in the range of 1–200.

The compounds which can be used in accordance with this invention to modify the curing of poly(arylene sulfide) are tetrakis [3-(3,5-di-tert-butyl-4-hydroxyphenyl)propionyloxymethyl]methane, 1,3,5-trimethyl tris [3,5-di-tert-butyl-4-hydroxybenzyl]benzene, octadecyl-3-(3',5'-di-tert-butyl-4'-hydroxyphenyl)propionate, or a polymeric phosphite. The polymeric phosphite used herein is a commercial product available from National Polychemicals Company under the trade designation Wytox 540.

These compounds are known antioxidants for polymeric materials. However, in the arylene sulfide polymer systems they have the effect of reducing melt flow. As a general rule, in effect, if any, of an antioxidant on melt flow is to stabilize the polymer against changes in melt flow.

The additives of this invention can be incorporated into the polymer prior to curing in any convenient manner. Thus, for example, the additives can be added as such to the polymer and the resulting mixture can be agitated in any convenient manner to achieve good mixing. A particularly convenient manner of introducing the additives into the polymer is the addition of the additive dissolved in a volatile solvent such as hexane, benzene, acetone and the like to the polymer in powder form with subsequent volatilization of the solvent. Alternatively, the additive dissolved in said solvent can be ball milled with powdered polymer. The additives can be melt blended but this is less preferred.

There are two broad aspects to this invention.

First, the additives of the invention are useful in accelerating the cure of virgin arylene sulfide polymer which has a melt flow too high to be useful in such applications as injection molding (precuring). Such polymer can be heated in air at a temperature of about 490° to 520°, preferably 500° to 510° for 1 to 10 preferably 2 to 6 hours to lower the original melt flow. Incorporation of additives to this invention allows for reduction in the time required to effect this lowering of melt flow or in the alternative, allows further reduction in melt flow for a given time. Thus, for instance, a polymer with a melt flow of 2500 or greater which is not suitable for fabrication operations such as injection molding can be heated after incorporation of the additive in accordance with this invention for 6 hours at 510°F to bring the melt flow into the range of 0 to 15, preferably 1 to 15. This melt flow is measured in terms of MFN (melt flow number) which is the grams of polymer flowing from an orifice in 10 minutes utilizing ASTM D 1238-65T, modified as noted to utilize a 5 kilogram weight and to operate at 650°F (343°C). The polymer during this pre-curing operation is generally in the solid state.

The use of the compounds of this invention speeds up the cure rate of either slow curing or fast curing resins.

For example, a slow curing arylene sulfide polymer will ordinarily require 6 hours at 510°F in air curing time to have a melt flow of less than about 400 without accelerators. A fast curing resin will cure to a melt flow of less than about 400 in 2–4 hours at 510°F. Very fast curing resins will cure to a melt flow of less than 100 in 1–2 hours at 510°F in air without additives.

Thus, in accordance with the first aspect of this invention, a virgin polymer with a melt flow of 50 to above 2500 which is unsuitable for many applications can be made suitable for such applications after a relatively short curing time by utilizing the additives of this invention.

In accordance with the second aspect of the invention, the additives are incorporated into arylene sulfide polymer which is utilized in a coating composition (curing). This allows reduction of the curing temperature from the normal level which can run as high as 800° down to within the range of 575° to 725°F, preferably about 600° to 700°F. The temperature obviously is related to the particular polymer utilized and to the time, of course, but in any event for a given polymer in a given curing time, the temperature for achieving a cure sufficient to give a good coating can be reduced preferably at least 100°F. below the temperature required to give a coating of similar quality without the additive. Similarly at a given cure temperature, the cure time can be reduced at least 10 minutes. The curing time will generally be from 10 to 40 minutes, preferably 15 to 30 minutes. Times of 15 to 20 minutes are particularly suitable. In addition to decreasing the cure time and/or temperature required, the resulting coatings made in accordance with this invention have increased flexibility.

Thus in accordance with this second aspect of the invention, the time and/or temperature required to cure a coating on a substrate can be reduced so as to allow coating of many substrates which would be adversely affected by the higher temperature and/or curing time. In fabricating pipe, for instance, the exposure of a substrate to long periods of high temperatures is undesirable because metal has a tendency toward embrittlement under such severe conditions. As with the first aspect of the invention, either a slow or fast curing arylene sulfide polymer can be used, although in all aspects of the invention the advantage is greater with the slow curing polymers.

In addition to the antioxidant additives of this invention, the compositions of this invention can contain other ingredients conventionally employed in arylene sulfide polymer compositions. For instance, fillers such as titanium dioxide, calcium carbonate, aluminum oxide, aluminum silicate, pigments, resins and/or plasticizers, ferric oxide, silicon dioxide, asbestos fibers, glass fibers, poly(tetrafluoroethylene), and the like can be present. Preferably the coating compositions will contain, based on 100 parts by weight polymer, 10 to 50 parts by weight of a filler pigment such as titanium dioxide and/or poly(tetrafluoroethylene).

When arylene sulfide polymer compositions in accordance with this invention are used as coating materials, the coatings can have a thickness of 0.25 to 25 mils. It is also within the scope of the invention to utilize a plurality of layers of the polymeric composition with the material being cured or at least partially cured between each coat. Preferably the total thickness will be in the range of 0.5 to 50 mils. The invention has been found to be of particular utility in the production of relatively thin coatings, that is coatings in which each layer has a thickness of about 0.5 to 5 mils.

The additives of this invention are employed in an amount within the range of 0.5 to 10, preferably 1 to 5, more preferably 1 to 3 weight per cent based on the weight of the arylene sulfide polymer.

EXAMPLE I

This example shows that the use of the additives of this invention makes possible the production of acceptable coatings from a relatively slow curing polyphenylene sulfide resin (Lot SC) which otherwise would give a poor coating after curing at 700°F for 30 minutes. The coating test formulations were three parts by weight of polyphenylene sulfide (PPS), one part $TiO_2$ (R-101, DuPont), and six parts of propylene glycol. The ingredients were mixed in a Waring blender along with the indicated percentage of additive. Coating test procedure was as follows:

1. cold rolled steel panels, 3 × 6 × 0.35 were degreased and heated in a gas-oxygen flame to a blue-gray color.
2. after cooling to room temperature, three coats of the formulation were applied with a No. 60 coating rod, and each coat was baked at 700°F for 30 minutes.
3. After the third coat bake, the coated panel was annealed for 2 hours at 450°F and then allowed to stand overnight at room temperature.
4. The coated panels were bent over a 3/16 inch diameter mandrel, and the elongated portion was examined with the aid of a microscope at 20× magnification.

The ratings of 1 to 5 correspond to the following observations:

| Rating | Observations |
| --- | --- |
| 1 | No cracking on the elongated portion of the annealed coating. (Very good) |
| 2 | Occasional micro-cracks along the elongated coating (Good) |
| 3 | Numerous micro-cracks and some cracking which may be barely visible to the unaided eye. (Not acceptable) |
| 4 | Cracks are continuous and easily visible (Poor) |
| 5 | Complete rupture of the coating. (Very poor) |

TABLE I

| Curing Additive | Additive Con., Wt. % Based on PPS | Coating Test Rating |
| --- | --- | --- |
| None | — | 5 |
| Irganox 1010[1][5] | 3 | 1 |
| Irganox 1076[2] | 3 | 5 |
| Wytox 540[3][5] | 3 | 1 |
| Ethyl 330[4][5] | 5 | 1 |
| Ethyl 330[4][5] | 3 | 2 |
| Ethyl 330[4][5] | 2 | 2 |
| Ethyl 330[4][5] | 1 | 2 |

[1]tetrakis[3-(3,5-di-tert-butyl-4-hydroxyphenyl)propionyloxymethyl]methane
[2]octadecyl-3-(3',5'-di-tert-butyl-4'-hydroxyphenyl)propionate. While this compound as ineffective for this purpose as will be shown in Table II hereinafter, it was effective in accelerating the cure at 510°F.
[3]a polymeric phosphite. National Polychemicals Co.
[4]1,3,5-trimethyl tris[3,5-di-tert-butyl-4-hydroxybenzyl]benzene
[5]In separate tests not reported in this application, these additives were tested in polymer with inherently good curing characteristics and at 600°F curing temperature no measurable improvement was noted.

The data show that excellent coatings can be obtained using these additives (except Irganox 1076) at a time and temperature which is insufficient to give a good coating without any additive. Irganox 1076 was effective under other conditions as shown in Table II.

EXAMPLE II

The same slow curing polyphenylene sulfide of Example I was admixed in the same manner with the same amount of titanium dioxide as in Example I except as noted where the additive was ball milled into the polymer. The mixture was precured at 510°F for 6 hours and the MFN determined. Results were as follows:

TABLE II

| Curing Additive[1] | Additive Con., Wt. % Based on PPS | MFN[2] | Method of Mixing Additive |
|---|---|---|---|
| Sulfur | 5 | 114 | Manual |
| None | — | 495 | Ball Milling[3] |
| Irganox 1010 | 3 | 6.9 | Ball Milling[3] |
| Irganox 1076 | 3 | 34.8 | Ball Milling[3] |
| Ethyl 330 | 3 | 1.9 | Ball Milling[3] |
| Wytox 540 | 3 | 6.5 | Ball Milling[3] |

[1]See Example I for chemical names of additives.
[2]The MFN is the flow of polymer in g/10 min. at 650°F with a 5 Kg weight after the material was cured at 510°F for 6 hours, using the ASTM D 1238-65T modified as noted.
[3]Overnight, i.e., 12 hours.

This example shows that the melt flow was reduced from 495 to a value within the range of 1.9 to 34.8. A known curing agent, sulfur, under these conditions reduced the MFN to a value of only 114, substantially higher than with the other additives.

EXAMPLE III

In this example identical conditions were utilized as in Example I except coating grade polyphenylene sulfides having faster cure rates were used as the base polymers identified as Lot Nos. FC-1 and FC-2 respectively. The purpose of this example is to show shorter cure times can be used at a constant 700°F cure temperature with the aid of the additives of this invention.

EXAMPLE IV

Additional runs were made utilizing the same slow curing polymer (Lot SC) and conditions of Examples I and II except the additives were ball milled and a second polymer (Lot FC-3), also a fast curing polymer was used. The results were as follows:

TABLE IV

| | PPS Lot SC | | PPS Lot FC-3 | | | |
|---|---|---|---|---|---|---|
| Additive[3] | Coating Test (700°F) 15 min. | 510°F/6 hr.[2] MFN | Coating Test[1] (700°F) 20 Min. | 15 Min. | 10 Min. | 510°F/6hr[2] MFN |
| None | 5 | 213 | 1 | 3 | 4 | 6.9 |
| Ethyl 330 | 4 | 28 | 2 | 3 | 5 | 1.2 |
| Irganox 1010 | 2 | 98 | 1 | 2 | 4 | 1.1 |
| Wytox 540 | 3 | 100 | 1 | 3 | 4 | 0.7 |

[1]Rating 5 is worst, 1 is best. The rating system is described in Example I. These coating formulations and the PPS powder for cure rates were ball milled overnight (about 12 hours).
[2]See Example II for definition of MFN.
[3]See Example I for chemical name of additives.

While only the Irganox 1010 was effective in improving coating quality in the fast curing polymer it can be seen that all of the additives were effective in the slow curing polymer. All of the additives were effective in accelerating the 510°F precure in both polymers.

While this invention has been described in detail for the purpose of illustration it is not to be construed as limited thereby but is intended to cover all changes and modifications within the spirit and scope thereof.

What is claimed is:

1. A method of forming a coated substrate comprising: applying a coating composition comprising an arylene sulfide polymer and an amount sufficient to reduce melt flow of said polymer of a compound selected from the group consisting of tetrakis[3-(3,5-di-tert-butyl-4-hydroxypheny)propionyloxymethyl]methane, 1,3,5-trimethyl tris[3,5-di-tert-butyl-4-hydroxybenzyl]benzene, and octadecyl-3-(3', 5'-di-tert-butyl-4'-hydroxyphenyl)propionate to a substrate; and heating said substrate for a time within the range of 10 to 40 minutes at a temperature within the range of 575°–725°F.

2. A method according to claim 1 wherein said polymer is a poly(phenylene sulfide), said time is 15 to 20 minutes and said temperature is 600° to 700°F.

3. A method according to claim 1 wherein said composition contains in addition 10 to 50 parts by weight of a pigment filler based on 100 parts by weight of said polymer.

4. A method according to claim 1 wherein said substrate is steel.

5. A method according to claim 1 wherein said compound is present in an amount within the range of 1 to 5 weight percent based on the weight of said polymer.

TABLE III

| Curing Additive[2] | Additive Conc., Wt. % Based on PPS | PPS No. | Coating Test Rating[1] after cure at 700°F for time of: 20 Min. | 15 Min. | 10 Min. |
|---|---|---|---|---|---|
| None | — | FC-1 | 3 | 5 | — |
| Ethyl 330 | 3 | FC-1 | 1 | 2 | — |
| None | — | FC-2 | — | 4 | 5 |
| Ethyl 330 | 3 | FC-2 | — | 1 | 5 |

[1]Rating 5 is worst, 1 is best. The rating system is described in Example I. The coating test ratings of the normal 700°F/30 min. bake for FC-1 and FC-2 are 1 or 2 and 1 respectively. The cure rate melt flow numbers for FC-1 and FC-2 are 8.4 and 8.2 respectively (after 6 hours at 510°F).
[2]See Example I for chemical names of additives.

6. A process according to claim 1 wherein said compound is tetrakis[3-(3,5-di-tert-butyl-4-hydroxyphenyl)propionyloxymethyl]methane.

7. A process according to claim 1 wherein said compound is 1,3,5-trimethyl tris[3,5-di-tert-butyl-4-hydroxybenzyl]benzene.

8. A method according to claim 1 wherein said compound is octadecyl-3-(3',5'-di-tert-butyl-4'-hydroxyphenyl)propionate.

9. A method according to claim 1 wherein said polymer is poly(phenylene sulfide).

* * * * *